United States Patent [19]

Takenaka

[11] Patent Number: 5,268,563
[45] Date of Patent: Dec. 7, 1993

[54] DEVICE FOR READING BAR CODES ON PHOTOGRAPHIC FILM

[75] Inventor: Yuji Takenaka, Kanagawa, Japan

[73] Assignee: Fuji Photo Film Co., Ltd., Kanagawa, Japan

[21] Appl. No.: 884,282

[22] Filed: May 13, 1992

Related U.S. Application Data

[63] Continuation of Ser. No. 343,646, Apr. 27, 1989, abandoned.

[30] Foreign Application Priority Data

Apr. 28, 1988 [JP] Japan .................. 63-106104

[51] Int. Cl.⁵ .................. G06K 7/10; G06K 13/24; G06K 13/28
[52] U.S. Cl. .................. 235/462; 235/440; 235/463; 235/475; 353/26 A
[58] Field of Search .................. 235/375, 376, 440, 456, 235/454, 462, 469, 475, 476, 463; 250/559, 561, 568, 566, 570, 571; 353/26 A, 26 R, 27 A, 27 R; 355/40, 41, 77, 50, 51; 354/21

[56] References Cited

U.S. PATENT DOCUMENTS

| | | | |
|---|---|---|---|
| 3,949,363 | 4/1976 | Holm | 235/462 |
| 4,147,928 | 4/1979 | Crean et al. | 235/454 |
| 4,207,473 | 6/1980 | Nakatani et al. | 250/570 |
| 4,219,737 | 8/1980 | Gagnon et al. | 250/570 |
| 4,408,344 | 10/1983 | McWaters et al. | 235/462 |
| 4,538,072 | 8/1985 | Immler et al. | 235/440 |
| 4,555,632 | 11/1985 | Vockenhuber | 250/560 |
| 4,629,876 | 12/1986 | Kubota et al. | 235/462 |
| 4,638,170 | 1/1987 | Kubota | 250/566 |
| 4,691,112 | 9/1987 | Wydler | 250/570 |
| 4,727,399 | 2/1988 | Matsumoto | 250/571 |
| 4,734,566 | 3/1988 | Senda et al. | 235/455 |
| 4,748,317 | 5/1988 | Satoh | 235/462 |
| 4,792,670 | 12/1988 | Fukara et al. | 250/211 R |
| 4,797,713 | 1/1989 | Terashita et al. | 355/77 |
| 4,806,990 | 2/1989 | Tahara | 355/75 |
| 4,825,387 | 4/1989 | Ono | 355/40 |
| 4,906,854 | 3/1990 | Rauh et al. | 250/570 |
| 4,918,484 | 4/1990 | Ujiie et al. | 355/77 |
| 4,961,086 | 10/1990 | Takenaka | 355/41 |
| 5,122,645 | 6/1992 | Saeki et al. | 235/462 |
| 5,128,519 | 7/1992 | Tokuda | 235/375 |

FOREIGN PATENT DOCUMENTS

| | | |
|---|---|---|
| 339376 | 11/1989 | European Pat. Off. |
| 52-111718 | 9/1977 | Japan |
| 56-128933 | 10/1981 | Japan |
| 8603041 | 5/1986 | PCT Int'l Appl. |

OTHER PUBLICATIONS

Patent Abstracts of Japan, vol. 6, No. 2, (P-96) [880], Jan. 8, 1982, JP-A-56 128 933.

*Primary Examiner*—Davis L. Willis
*Assistant Examiner*—Edward H. Sikorski
*Attorney, Agent, or Firm*—Sughrue, Mion, Zinn, Macpeak & Seas

[57] ABSTRACT

A device for reading bar codes affixed in a predetermined order on an elongated photographic film. The bar codes are provided at the same positions relative to a plurality of image frames that are recorded in the longitudinal direction of the photographic film as the photographic film is being conveyed in the longitudinal direction. The film includes a plurality of symbol reading units disposed parallel to the direction in which the photographic film is being conveyed for reading symbols. The results read by the plurality of symbol reading units are compared with each other, and a determination is made as to whether or not the read symbol is a bar code on the basis of the comparison results. In consequence, it is possible to prevent erroneous detection of bar codes.

11 Claims, 8 Drawing Sheets

DEVICE FOR READING BAR CODES ON PHOTOGRAPHIC FILM

This is a continuation of application Ser. No. 07/343,646 filed Apr. 27, 1989, now abandoned.

BACKGROUND OF THE INVENTION

1. Field of the Invention

The present invention relates to a device for reading bar codes on a photographic film which is capable of identifying the numbers and the positions of image frames by reading the bar codes affixed to the image frames.

2. Description of the Related Art

In a photographic printing apparatus, a photographic film such as a negative or positive film is mounted on a negative carrier. This carrier together with the photographic film is disposed at a printing position in a printing apparatus body for printing. The long negative mounted on the negative carrier is conveyed in the longitudinal direction thereof by a conveying device mounted on the negative carrier so that the image frames can be sequentially located at the printing position for printing.

Bar codes are affixed to the individual image frames at the same positions relative to the individual image frames. An image frame is selected for printing by reading the bar code affixed to the image frame by a sensor, the selected image frame being automatically positioned at the printing position using a notch formed in correspondence with each of the image frames. The bar codes correspond to the frame numbers which are assigned to the frames in a predetermined order in the longitudinal direction of a negative. This enables the bar code corresponding to a desired frame number to be retrieved by inputting the frame number by an operator therefore, it is possible to facilitate the positioning of desired image frames even when printing of the image frames is performed discontinuously for reprinting or making additional copies.

However, figures representing image frame numbers or the name of a film maker may also be provided on a negative at positions which form the same locus as that of the bar codes. In consequence, the sensor may erroneously read the figures or the letters as bar codes. This leads to a misalignment of a desired image frame or an erroneous detection of a desired bar code. This problem can be solved if other symbols or figures are provided at positions at which the locus thereof does not coincide with that of the bar codes. However, it is impossible to ensure sufficient space for these symbols and figures because the portion of the negative, other than the image frames, is small.

SUMMARY OF THE INVENTION

In view of the above-described disadvantage of the related art, an object of the present invention is to provide a photographic film bar code reading device which is capable of reliably reading only the bar codes affixed to a photographic film.

To this end, the present invention provides a device for reading bar codes affixed in a predetermined order to an elongated photographic film at the same positions relative to at least one image frame recorded in the longitudinal direction of the photographic film while the photographic film is being conveyed in the longitudinal direction. The bar code reading device includes a plurality of symbol reading means disposed parallel to the direction in which the photographic film is conveyed for reading symbols, a comparison means for comparing the results of reading performed by the plurality of symbol reading means, and a determination means for determining whether or not a symbol that has been read is a bar code on the basis of the comparison results of the comparison means.

In the present invention, symbols on a photographic film are read by a plurality of symbol reading means while the photographic film is being conveyed. The plurality of symbol reading means are disposed parallel to the direction in which the photographic film is conveyed. Generally, the symbols such as bar codes are symmetrical in the longitudinal direction thereof (in the direction perpendicular to the direction in which the photographic film is conveyed). In consequence, when a suitable bar code is read, all the detection results coincide with each other.

As a result, if it is determined by the comparison means that the detection results of the plurality of symbol reading means are not identical, the determination means determines that a symbol including a figure other than a bar code is read. This prevents an image frame from being shifted when it is to be positioned, which would occur when a symbol other than a bar code is erroneously detected as a bar code.

DETAILED DESCRIPTION OF THE PREFERRED EMBODIMENTS

Figure 1:
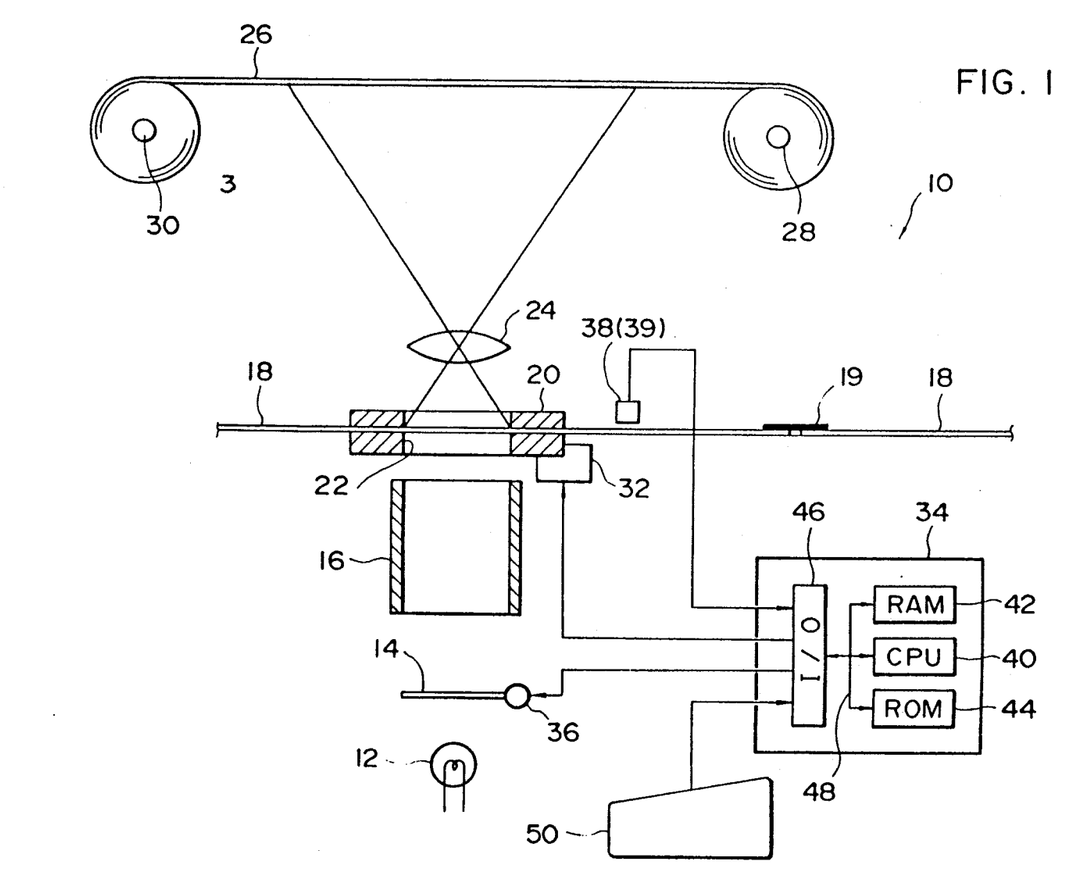
FIG. 1 is a schematic view of an example of a photographic printing apparatus to which the present invention is applied.

FIG. 1 shows a photographic printing apparatus 10 to which the present invention is applied. In this photographic printing apparatus, light emitted from a light source 12 passes through a shutter 14 and a light diffusing cylinder 16 and reaches a negative 19 which is a photographic film. The negative 18 carries a plurality of image frames in the longitudinal direction thereof. The end portion of the negative 18 is coupled to another negative 18 having the same form by splicing tape 19. This enables a plurality of negatives to be successively conveyed. The negative 18 is held by a negative carrier 20. The negative carrier 20 has an opening 22. An image of the image frame located at this opening 22 is formed on a lens 24. The negative 18 has notches 18b formed on each image frame. A desired image frame can be readily located at the printing position by detecting the corresponding notch 18B by a notch detecting sensor (not shown). The notches 18B are formed on the negative 18 by a notch puncher (not shown) after the development of the negative 18.

The light that passes through the lens 24 reaches an emulsion coated surface of a sheet of printing paper 26 to cause the printing paper 26 to be exposed to the light.

The two ends of the printing paper 26 are respectively wound around winding rollers 28 and 30. Each time one image is formed on the printing paper 26, the sheet of printing paper 26 is unwound from the roller 28 and wound around the roller 30.

The negative carrier 20 is provided with a driving device 32 for conveying the negative 18. The driving device 32 is driven by a signal sent from a control device 34. The driving device 32 is a pulse motor which conveys the negative 18 in accordance with the number of pulses supplied from the control device 34. In this embodiment, the negative is conveyed by 0.1 mm per one pulse supplied to the pulse motor. The shutter 14 is also connected to the control device 34 through a driver 36 so that it can be opened for a predetermined period of time when printing is performed.

A pair of position information detecting sensors 38 and 39, which serve as position information detecting means, are disposed on the upstream side of the negative carrier in order to read bar codes 18A (see FIG. 2) provided on the negative 18 while the negative 18 is being conveyed. The position information detecting sensors 38 and 39 are provided in the longitudinal direction of the bar code 18A so that the presence or nonpresence of a bar code 18A can be detected in the vicinity of the two longitudinal end portions of the bar code 18A. The data representing the bar code 18A read by the position information detecting sensors 38 and 39 is supplied to the control device 34.

Figure 2:
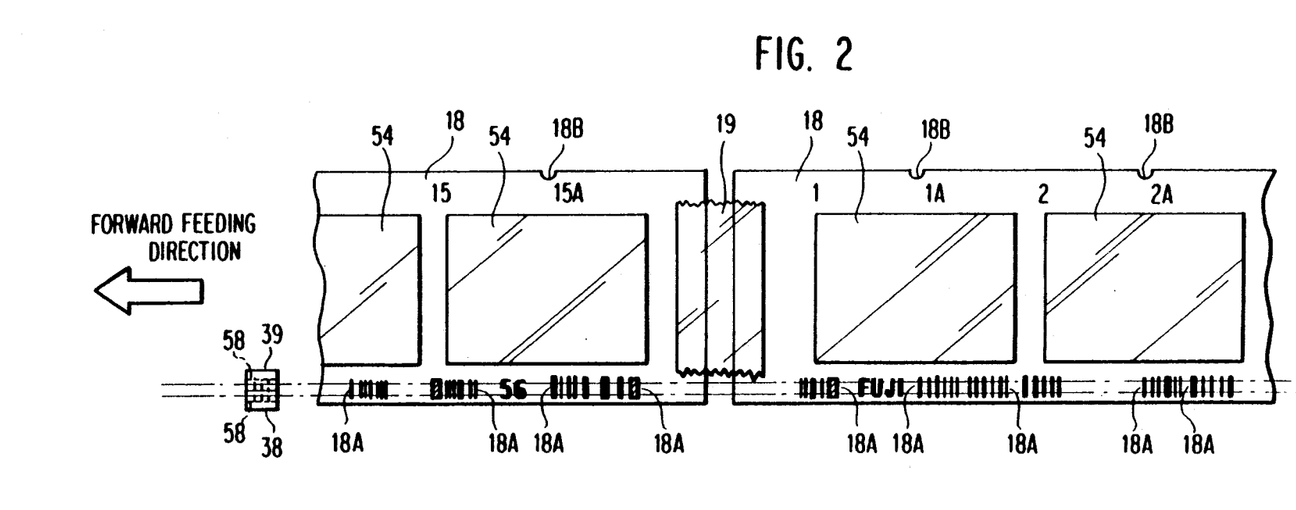
FIG. 2 is a plan view of a negative.

Symbols other than the bar codes 18A or characters may be provided on the negative 18 at positions which form the same locus as that of the bar codes 18A. More specifically, Arabic figures representing frame numbers may be provided on the negative in addition to the bar codes 18A. These Arabic figures may be read as bar codes 18a by mistake 18A, causing reading errors. While the bar codes have the same height, the figures are not symmetrical in the vertical direction. In consequence, the control device 34 makes a determination as to whether or not the detected values of the two position information detecting sensors 38 and 39 coincide with each other, thereby preventing erroneous reading of symbols other than the bar code.

The control device incorporates a CPU 40, a RAM 42, a ROM 44, an I/O (input/output) port 46 and a data bus and control bus that interconnect these components. The driver 36 for the shutter 14, the driving device 32 and the position information detecting sensors 38 and 39 are all connected to the I/O 46 through signal lines. Also, a keyboard 50 is connected to this I/O 46.

As shown in FIG. 2, the bar codes 18A are provided on the negative 18 at the same positions relative to individual image frames 54. The position information reading sensors 38 and 39 are disposed at positions which are on the locus of the bar codes 18A.

The bar codes 18A correspond to the image frame numbers. The data read by the position information reading sensors 38 and 39 is passed through a data conversion circuit 56 (see FIG. 3). The converted data is used to recognize the frame number corresponding to the bar code 18A which is represented by the data read by the position information reading sensors 38 and 39. In consequence, the frame number designated by the keyboard 50 can be retrieved by comparing the frame number detected on the basis of the data read by the position information reading sensors with the designated frame number. The frame numbers are appended in a predetermined order (for example, in the order of 1, 1A, 2, 2A, 3, 3A . . . ). The frame numbers are stored in the RAM 42 of the control device 34.

Figure 3:
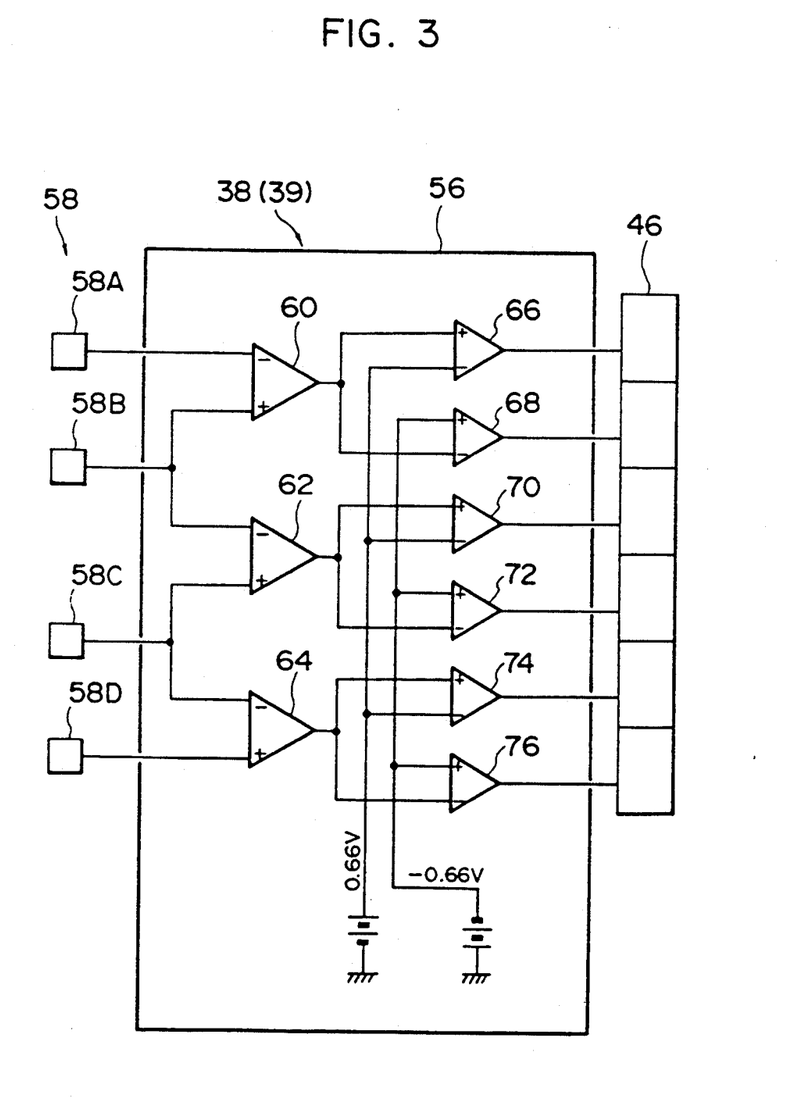
FIG. 3 is a block diagram of a data conversion circuit of a position information detecting sensor.

The position information detecting sensor 38 (39) has four detecting units 58A, 58B, 58C and 58D and the data conversion circuit 56, as shown in FIG. 3. The bars that form a bar code 18A fall into two types: a wide one and a narrow one. The distance required for the detecting units 58A, 58B, 58C and 58D to be disposed is equivalent to the width of the wide bar. The bar code which has the narrower width equals to the space required for the two detecting units.

The detecting unit 58A is connected to a negative input terminal of a first differential unit 60. The detecting unit 58B is connected to a positive input terminal of the first differential unit 60 and to a negative input terminal of a second differential unit 62. The detecting unit 58C is connected to a positive input terminal of the second differential unit 62 and to a negative input terminal of a third differential unit 64. The detecting unit 58D is connected to a positive input terminal of the third differential unit 64.

The output of the first differential unit 60 is connected to a positive input terminal of a first comparator 66 and to a negative input terminal of a second comparator 68. The output of the second differential unit 62 is connected to a positive input terminal of a third comparator 70 and a negative input terminal of a fourth comparator 72. The output of the third differential unit 64 is connected to a positive input terminal of a fifth comparator 74 and to a negative input terminal of a sixth comparator 76. Further, a voltage of $+v$ (which is 0.66 v) is applied to the negative input terminals of the first, third and fifth comparators 66, 70 and 74, and a voltage of $-V$ (which is $-0.66$ V) is applied to the positive input terminals of the second, fourth and sixth comparators 68, 72 and 76. In consequence, data representing a value determined by a difference in the outputs of the adjacent detecting units in accordance with an absolute value is input to the I/O 46 of the control device 34. In other words, the first and second comparators output high level signals when $|A-B|>0.66$ V. When $|A-B|<0.66$ V, they output low level signals. In this way, the difference in the outputs of the adjacent detecting units can be determined. The detected data representing the output differences is supplied to the control device 34. The control device 34 determines, in response to the differences in the outputs of the detecting units 58A, 58B, 58C and 58D, whether a white portion or a black portion of a bar code 18A is passing through the detection position. It also determines the width of a bar which is passing through the detection position (whether a wide bar or a narrow bar is passing). The determination procedure will be described below with reference to FIG. 4. Here, the outputs of the detecting units 58A, 58B, 58C and 58D are respectively simplified as A, B, C and D.

In a case where it is determined that $A>B=C=D$, as shown in FIG. 4 (A), A only is larger than the other outputs, which means that a white bar is passing through the detecting unit 58A.

Figure 4A:
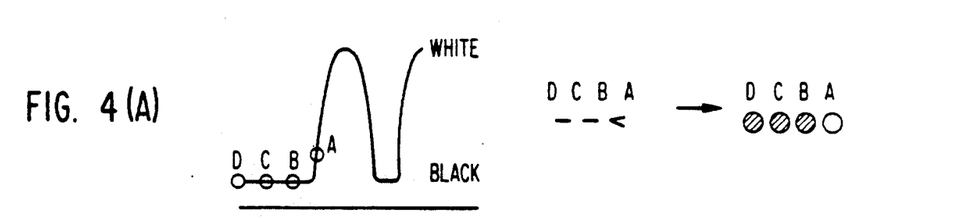
FIGS. 4(A) to 4(E) illustrate the procedure for determining a bar code on the basis of the detection results of detecting units.
Figure 4B:
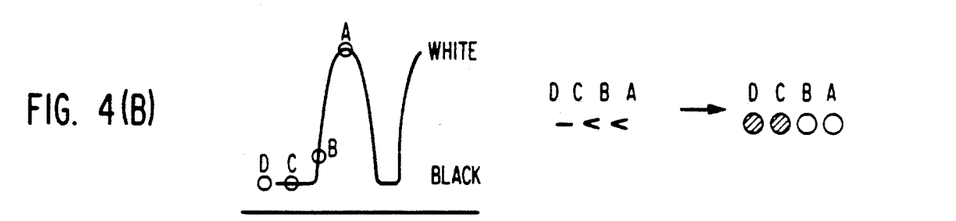
Figure 4C:
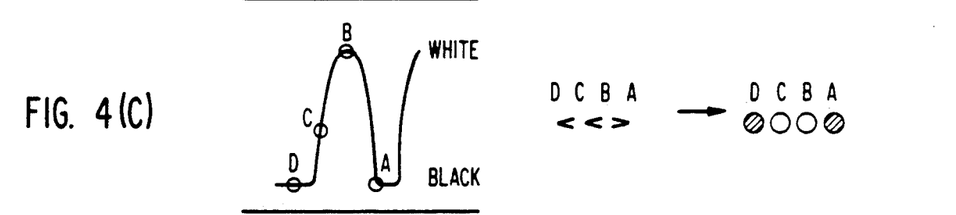
Figure 4D:
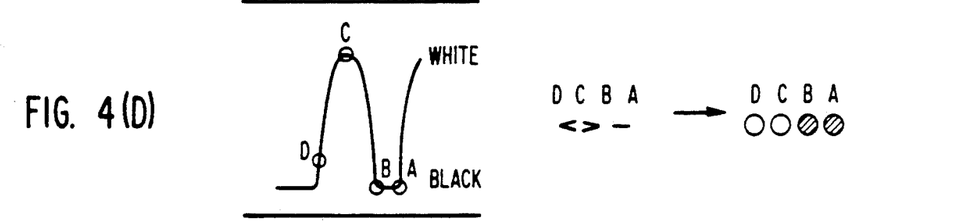
Figure 4E:
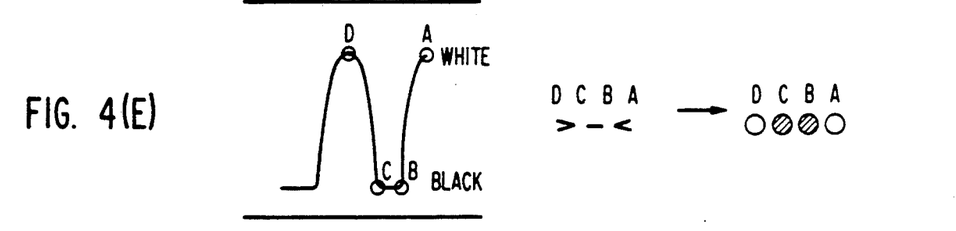

Next, the negative moves to become in the condition shown in FIG. 4(B). When the control device 34 determines that $A>B>C=D$, it is determined that A and B have differences in output between others, which means that the detecting units 58A and 58B are together detecting the white bar.

Next, the control device 34 determines that $A<B>C>D$, as shown in FIG. 4 (C). This means that the white bar passed through the detecting unit 58A and that the detecting units 58B and 58C are together detecting the white bar. In consequence, the control device recognizes that the detected bar is a narrow white bar.

Subsequently, the control device 34 determines that A=B<C<D, as shown in FIG. 4 (D). A, B, C and D are shifting in the forward direction from the state shown in FIG. 4 (C), and the control device confirms that the negative is moving in the forward direction.

Thereafter, the control device determines that A>B=C<D, as shown in FIG. 4 (E). This means that only the detecting units 58B and 58C are together detecting the black bar. The control device therefore recognizes that the previously detected narrow white bar is followed by a narrow black bar.

Figure 5A:
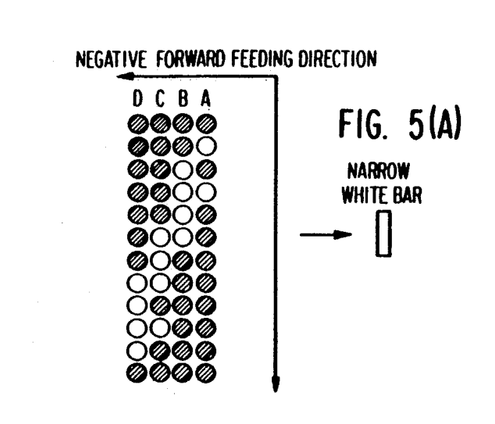
FIGS. 5(A) and 5(B) show how the outputs of the detecting units change as a bar code moves along.
Figure 5B:
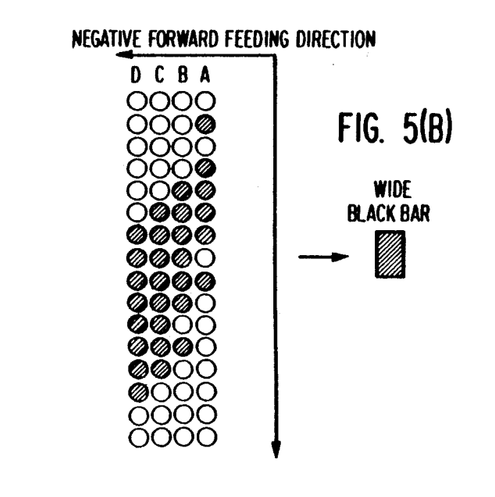

FIG. 5 shows changes in the outputs of the detecting units 58A, 58B, 58C and 58D which occur as a bar code 18A passes through the detecting units. More specifically, FIG. 5(A) shows changes in the outputs of the detecting units 58A, 58B, 58C and 58D which occur as a narrow white bar code passes through the detecting units. FIG. 5(B) shows changes in the outputs of the detecting units 58A, 58B, 58C and 58D which occur as a wide black bar passes the detecting units. As can be seen in FIGS. 5(A) and 5(B), it is thus possible to check whether the negative is stopped or fed in the reverse direction.

Figure 6:
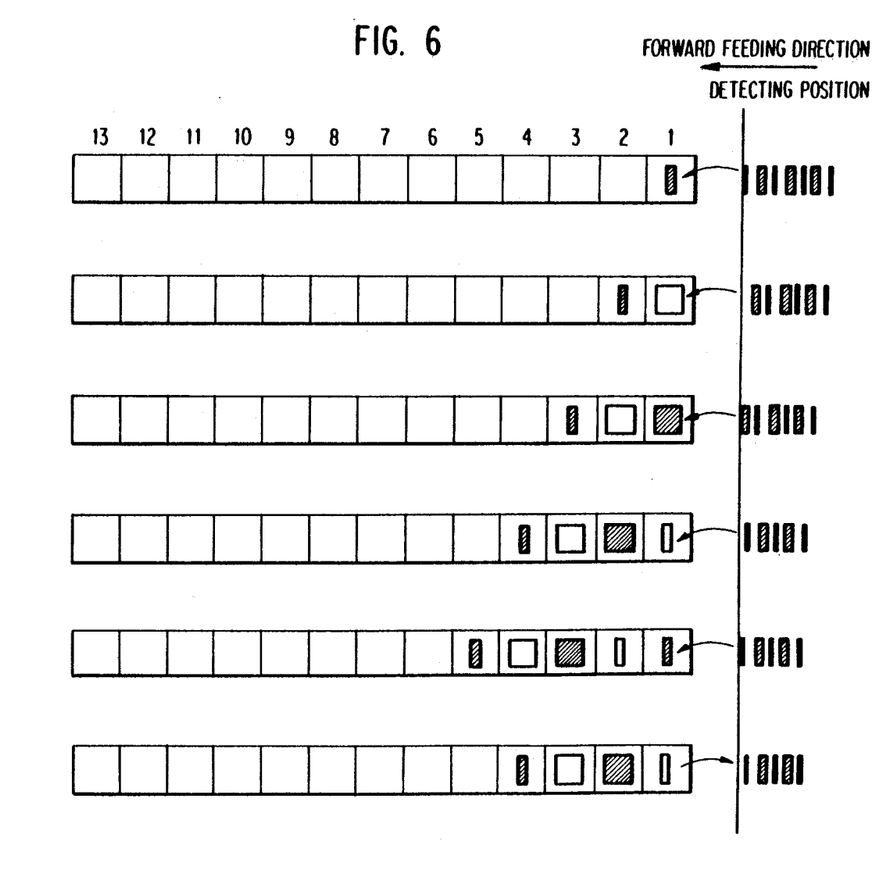
FIG. 6 illustrates how a bar code is set in a table.

By repeating the above-described detection, the control device 34 sequentially inserts a combination of bars (13 bars in this embodiment) that form a bar code 18A in a table (or a buffer) of the RAM 42. At that time, the detected bar is always inserted from a first portion of the table (from the right side of the table, as viewed in FIG. 6), the already inserted bars being individually shifted to the left as a newly detected bar is inserted in the table. In a case where the negative 18 is fed in the reverse direction, the bars inserted in the table are extracted from the right side of the table. At that time, the individual bars are shifted to the right in the table, as a bar is extracted from the table. Once 13 segments of the table are filled with bars that form a bar code 18A, the control device 34 performs data matching, that is, the control device 34 collates the image frame number corresponding to the detected bar code 18A.

In this embodiment, the control device 34 operates a number of pulses that are applied to the pulse motor in order to obtain a bar code reading position corresponding to frame number 0 (a reference position) by using the frame number corresponding to the read bar code 18A and the number of pulses which have been applied to the pulse motor in order to position that bar code at the bar code detected position. For example, if the read bar code 18A represents frame number 2A and the number of pulses applied to the pulse motor is 1000, the number of pulses required to obtain a bar code reading position representing frame number 0 is obtained by the following equation:

$$5 \times 190 + 1000 = 1950$$

where 5 represents the number of steps by which the bar code representing frame number 2A is separated from the bar code identifying frame number 0, and 190 mm which represents the distance (which is equivalent to image frame pitch of half size images) through which the negative is fed by the application of one pulse to the pulse motor.

In this embodiment, the above-described calculation is performed at two different bar code reading positions. If the number of pulses required for the reference position which is calculated on the basis of a previous bar code reading position does not coincide with that for the reference position, which is calculated on the basis of a subsequent bar code reading position, the number of pulses corresponding to the bar code read at the previous time is cancelled. In addition, a number of pulses for the reference position which is calculated on the basis of a new bar code reading position is obtained. The obtained number of pulses is then compared with the number of pulses obtained at the subsequent time. This calculation and comparison are repeated until the number of pulses required for the reference position, which are calculated on the basis of the two different bar code reading positions become identical. This enables an accurate number of pulses required for the reference position to be obtained.

In this way, it is possible to determine the number of pitched pulses which are respectively made to represent the bar code positions with the reference position serving as a starting point. Further, since the frame numbers are appended in a predetermined order, it is possible to determine whether or not the reading is performed accurately by comparing the frame number calculated using the calculated number of pulses with the actually read frame number.

The position information detection unit 58 also detects the connected portion of the negatives 18. More specifically, the control device 34 determines that the beginning of a new negative 18 has been detected when the position information detecting unit 58 detects the splicing tape 19 that connects the negatives 18. The control device then updates the frame numbers stored in the RAM 42 each time the splicing tape 19 is detected so as to newly define the number of pulses required for the reference position.

Figure 7:
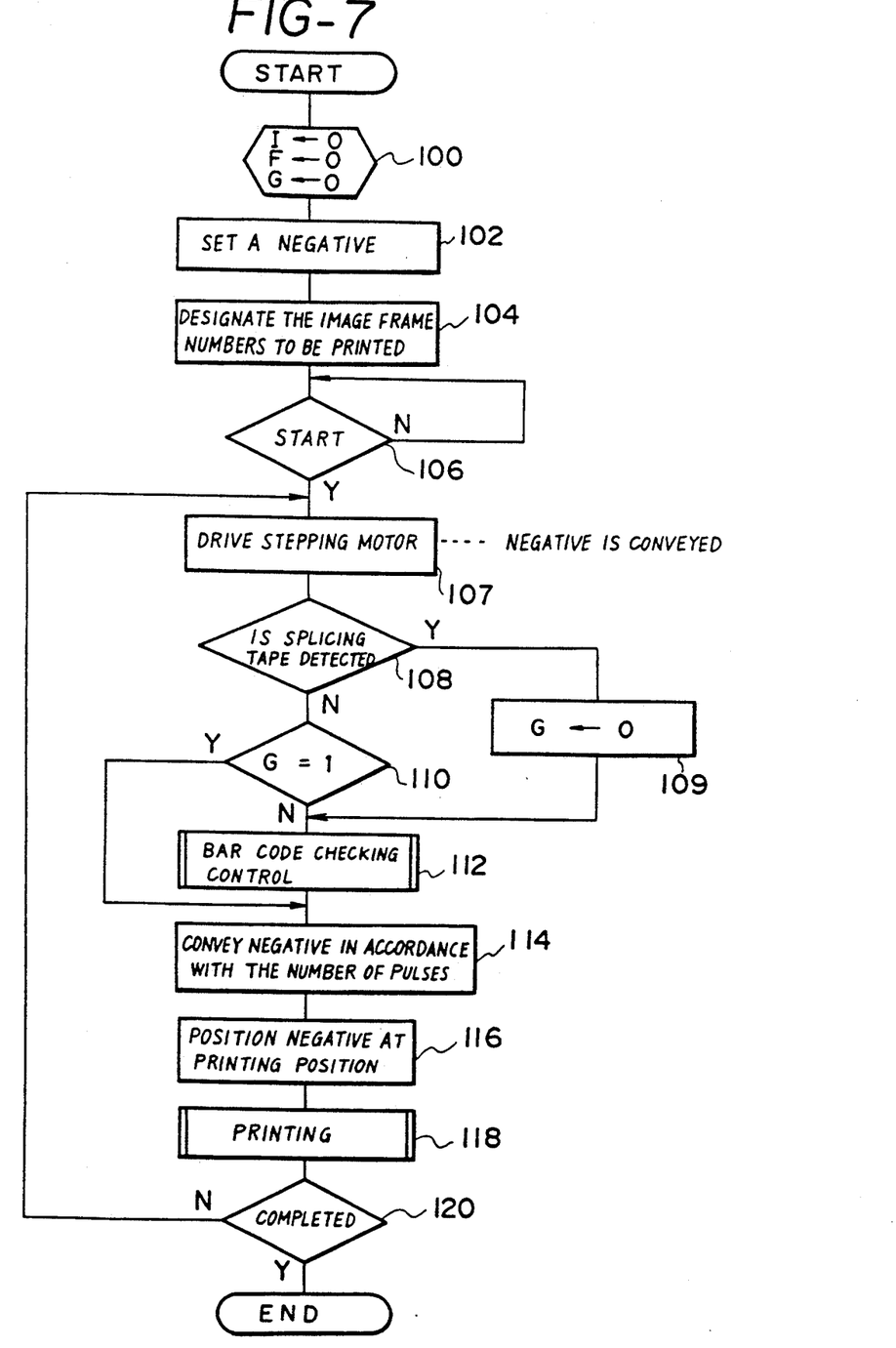
FIGS. 7 to 9 are flow charts of the control routines.
Figure 8:
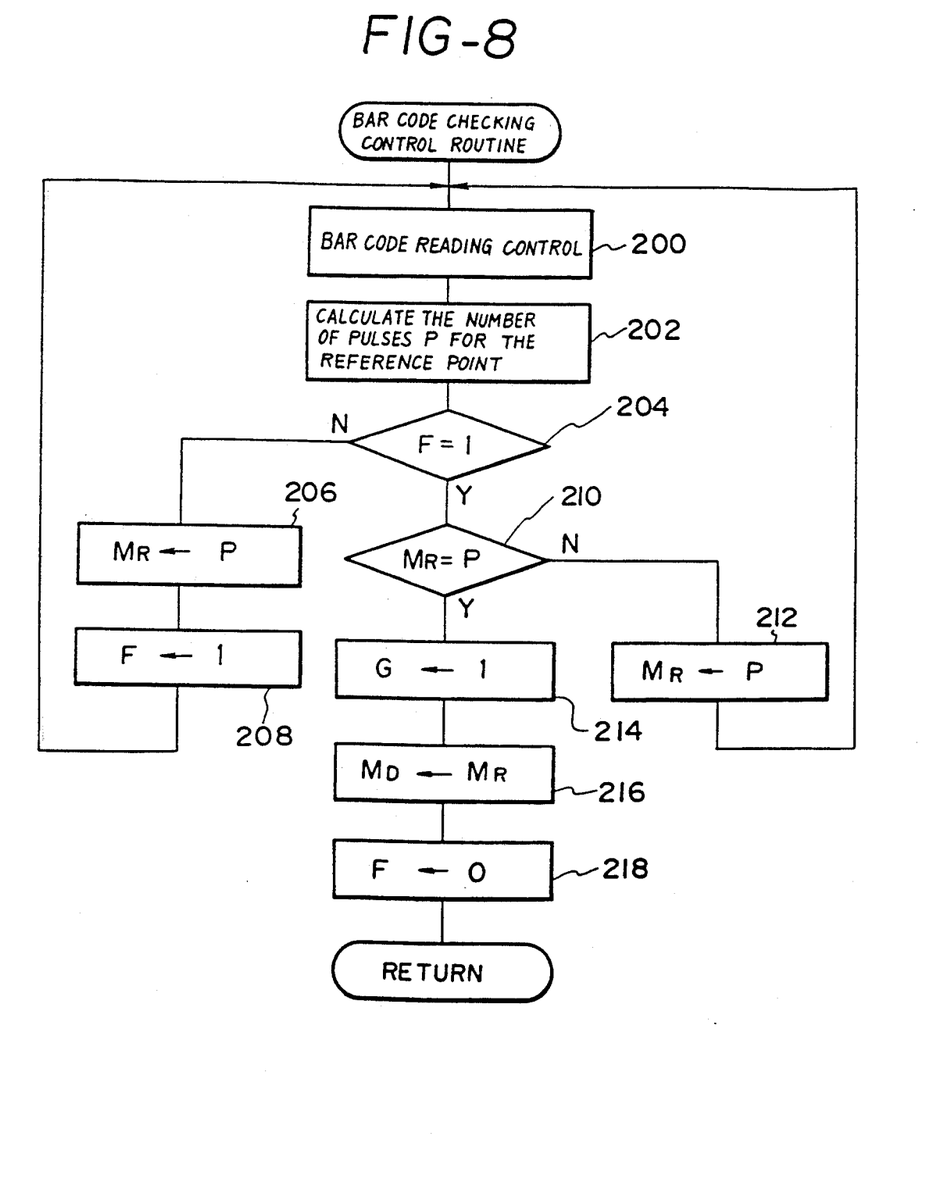
Figure 9:
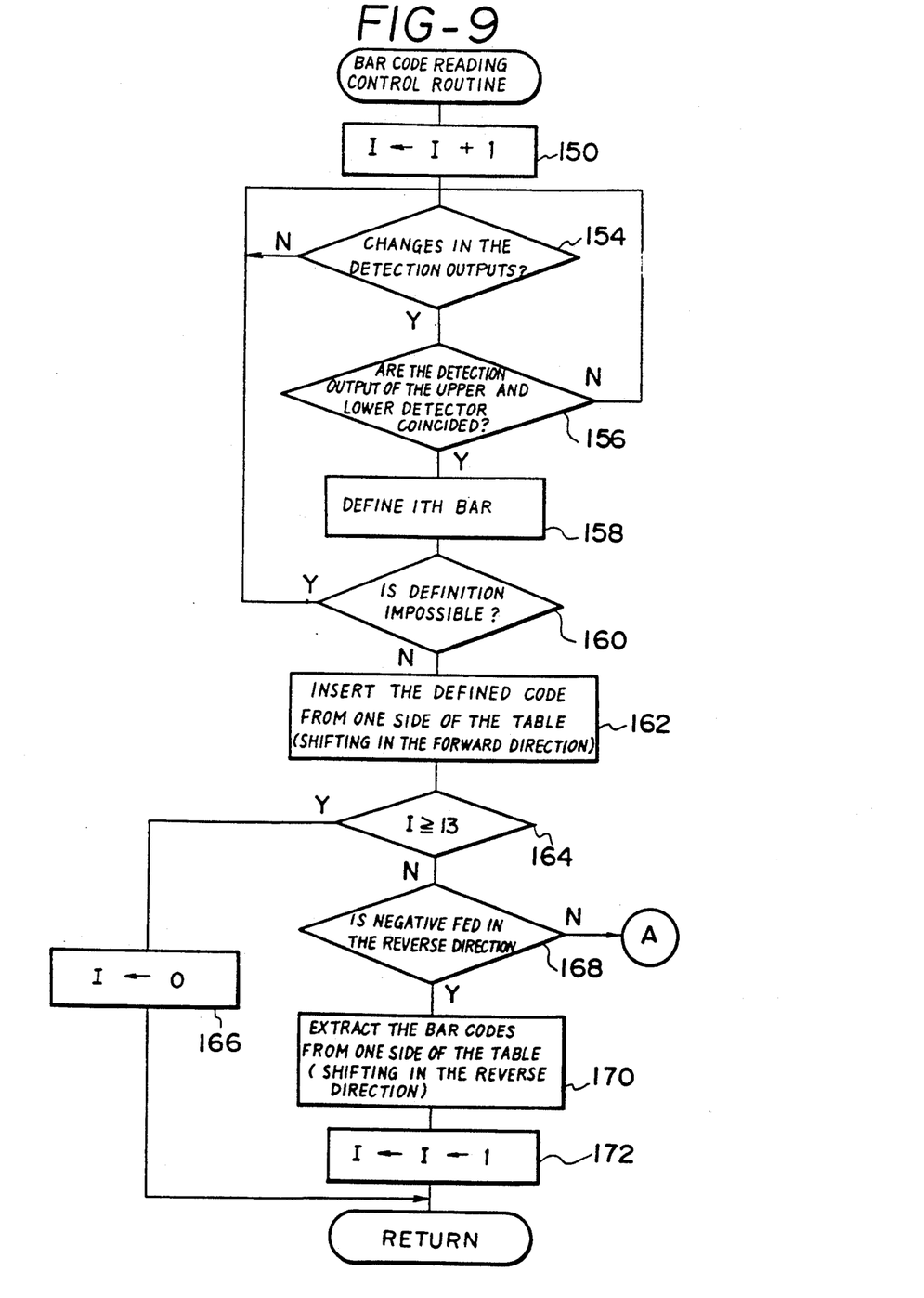

FIGS. 7 to 9 are flowcharts of the operation of this embodiment.

As shown in FIG. 7, variable I is set at 0, and flags F and G are reset, i.e., become 0, in step 100. Next, a negative 18 is set in step 102, and the frame numbers representing the image frames on which printing is to be performed are then designated in step 104. The frame numbers designated may be successive or intermittent.

Next, an operator switches on a start switch or the like to start the printing operation in step 106. The driving device 32 is thereby driven (the stepping motor is started) in step 107. Subsequently, it is determined in step 108 whether or not the splicing tape 19 is detected. If the answer is no, the control device determines that a subsequent negative 18 is not yet supplied, and the processing goes on to step 110 where it is determined whether or not flag G is set. If the answer is no, the control device determines that the bar code positions and the number of pulses for the stepping motor are not yet collated with each other (the number of pulses required for the reference position is not yet set). Processing then proceeds to step 112 where the bar code checking control routine is executed. This bar code checking control routine will be described later in detail.

If the splicing tape 19 is detected in step 108, the processing goes to step 109 where the flag G is reset. The processing then goes on to step 112. Further, if it is determined in step 110 that the flag G is set, since the bar codes and the numbers of pulses are collated with each other (the number of pulses required for the reference point is set), the processing skips step 112 and goes on to step 114.

In step 114, the negative is conveyed in accordance with the number of pulses required for the designated frame number position. The designated image frame is then located at the printing position in step 116. Once the designated image frame has been located at the printing position, printing is processed in step 118. Next, it is determined in step 120 whether or not the printing of the designated image frames is completed. If the answer is no, the processing returns to step 107. In this way, the designated image frames are sequentially located at the printing position and printing is sequentially performed on the image frames located at the printing position. Once printing has been performed on all the designated image frames, this control routine is complete.

Next, the bar code checking control subroutine, which is executed in step 112, will be described below with reference to the flowchart in FIG. 8.

First, the bar code reading control subroutine which is described later is executed in step 200. Once the bar code is read, the number of pulses p required for the reference point (the frame number 0 position in this embodiment) is calculated on the basis of this bar code using the above-described equation in step 202. Next, it is determined in step 204 whether or not flag F is set. Since flag F is in a reset stage at the first bar code reading time, the processing goes on to step 206 where the calculated value P is written in a holding memory $M_R$. Next, 1 is set in flag F in step 208, and the processing then returns to step 200. If it is determined in step 204 that 1 is set in flag F, since the holding memory $M_R$ stores the calculated value P, the calculated value P is compared with the value in the holding memory $M_R$ in step 210. If $M_R \neq P$, the processing goes to step 212 where the newly calculated value P is written in the holding memory $M_R$ (the value in the holding memory $M_R$ is updated), and the processing then returns to step 200 so as to execute steps 202, 204, 210 and 212.

If it is determined in step 210 that $M_R = P$, the control device determines that the number of pulses required for the reference point has been precisely calculated, and the processing proceeds to step 214 where 1 is set in flag G, which indicates that the number of pulses for the reference position employed in the checking control executed in step 110 of the main routine (FIG. 7) has been defined. Next, in step 216, the value stored in the holding memory MR is written in the defined memory $M_D$. Subsequently, the flag F is reset in step 218, thereby completing this bar code checking control subroutine.

Next, the bar code read control subroutine which is executed in step 200 will be described below with reference to the flowchart in FIG. 9.

First, variable I is incremented in step 150, and it is then determined in step 154 whether or not there are changes in the outputs of the detecting units 58A, 58B, 58C and 58D while the negative 18 is being conveyed. If the answer is no, the processing executed in step 154 is repeated. If the answer is yes, the processing proceeds to step 156 where it is determined whether or not the outputs of the detecting units 58A, 58B, 58C and 58D of the detector (38) located at one longitudinal end portion of the bar code 18A is identical with those of the detecting units of the detector (39) located at the other longitudinal end portion of the bar code 18A. If the answer is no, i.e., if the two combinations of the outputs are not identical, it is determined that the detected symbol may be a figure or the like which is not symmetrical in the vertical direction. In that case, since it is not necessary for the detected symbol to be collated with a bar code in response to the output of the detector, the processing returns to step 154. More specifically, figures and symbols other than the bar codes 18A may be present on the locus formed on the negative 18 by the detecting units 58A, 58B, 58C, and 58D. In consequence, in this embodiment, the bar codes 18A are read in the vicinity of both the two longitudinal end portions thereof (see the dot-dashed line and the dot-dot-dashed line in FIG. 2). This prevents the control device from erroneously recognizing figures as bar codes 18A, thereby preventing erroneous detection.

If it is determined in step 156 that the outputs of the upper and lower detecting units are identical, the control device determines that the detected symbol is a bar that constitutes a bar code, and therefore defines the detected symbol as an Ith bar of a bar code in step 158. If such determination is impossible this is recognized in step 160, processing returns to step 154. If the Ith bar is defined in step 158, this is recognized in step 160, and the defined bar is then inserted into the table in the RAM 42 from one side thereof (the right side as viewed in FIG. 6) in step 162. In that case, if a row of bars have been already set in the table, they are sequentially shifted in the forward direction.

Next, it is determined in step 164 whether or not the variable I is 13, which is the upper limit of a bar code. If it is determined that I≧13, the control device determines that all the bars that constitute one bar code 18A have been read. Thereafter, the variable I is reset to 0 in step 166, and then the processing returns to the main routine.

If it is determined that I<13 in step 164, the control device determines that reading of one bar code is not yet completed, and the processing goes to step 168 where it is determined whether or not the negative 18 is being fed in the reverse direction. If the negative 18 is not being fed in the reverse direction, the processing goes to step 108 of the main routine. If it is, the processing proceeds to step 170 where a number of bars corresponding to the amount of reverse feeding are moved out of the table from one side thereof (the right side thereof as viewed in FIG. 6). At that time, the remaining bars are sequentially shifted in the table in the reverse direction. Once the step 170 has been executed, variable I is decremented in step 172, and processing then returns.

Thus, the bars that constitute one bar code are detected one by one from the changes in the outputs of the detecting units 58A, 58B, 58C and 58D. In a case where the negative is fed in the reverse direction, a number of bars corresponding to the amount of reverse feeding are cancelled, thereby ensuring a reliable bar code reading operation which eliminates any reading errors.

Thus, in this embodiment, an image frame determined in accordance with the number of pulses from the pulse motor can be confirmed. In a case of a read error, a frame number representing an erroneously read image frame can be estimated. In consequence, it is possible to smoothly perform the printing operation in a designated order without temporarily interrupting the printing operation and without cancelling the printing operation to be performed on the image frames corresponding to erroneously read bar codes.

Further, in a case where a plurality of negatives are connected, the connected portion of the adjacent negatives can be recognized by detecting the splicing tape 19, thereby eliminating the possibility of the erroneous recognition of the image frames.

Furthermore, in this embodiment, since the position information detecting sensors are disposed in the vicinity of the two longitudinal end portions of a bar code, it is possible to prevent erroneous recognition of the figures or the like that moves on the same locus as that of the bar code 18A, thus improving the workability.

As will be understood from the foregoing description, the bar code reading device according to the present invention is capable of reliably reading only the bar codes affixed to a photographic film.

What is claimed is:

1. A device for reading bar codes affixed in a predetermined order to an elongated photographic film having a longitudinal direction, while said photographic film is being conveyed in the longitudinal direction, comprising:

symbol reading means arranged adjacent to a conveyance path of said photographic film for reading symbols, said symbol reading means including a pair of information reading sensors, said pair of sensors each having multiple detector elements arrayed in said longitudinal direction, the elements in said respective sensors simultaneously reading different portions of a single symbol;

a comparison means for comparing results from said sensors to determine whether or not said results are identical; and a determination means for determining that said symbol is a bar code when the comparison results are identical.

2. A bar code reading device for a photographic film according to claim 1, further including a storage means for storing bars that constitute one bar code in the order in which they are read by said symbol reading means while shifting them in said storage means.

3. A bar code reading device for a photographic film according to claim 2, wherein said storage means feeds out said bars that constitute the bar code in the order reverse to that in which they are stored in said storage means while shifting them in said storage means when said photographic film is fed in the reverse direction.

4. A bar code reading device for a photographic film according to claim 3, wherein said symbol reading means is capable of detecting connecting means that connect a plurality of photographic films in the longitudinal direction thereof.

5. A device for reading bar codes, according to claim 1, wherein said symbol represents bar codes and alphanumeric characters, and wherein said determination means determines that said symbol represents a bar code and not an alphanumeric character when said results are identical.

6. A device for reading bar codes affixed in a predetermined order to an elongated photographic film having a longitudinal direction, while said photographic film is being conveyed in the longitudinal direction, comprising:

a pair of bar code reading means disposed adjacent to one another to form a row extending in a direction transverse to said longitudinal direction, each of said bar code reading means including multiple detectors arrayed in said longitudinal direction, said multiple detectors of said respective bar code reading means simultaneously reading different portions of one of said bar codes;

a comparison means for comparing the results of readings performed by said bar code reading means to determine whether said results are identical; and a determination means for determining that the data read represents a bar code when the comparison results are identical.

7. A bar code reading device for a photographic film according to claim 6, further including a storage means for storing bars that constitute one bar code in the order in which they are read by said bar code reading means while shifting them in said storage means.

8. A bar code reading device for a photographic film according to claim 7, wherein said storage means feeds out said bars that constitute the bar code in the order reverse to that in which they are stored in said storage means while shifting them in said storage means when said photographic film is fed in the reverse direction.

9. A bar code reading device for a photographic film according to claim 6, wherein said bar code reading means is capable of detecting splicing tapes that connect a plurality of photographic films in the longitudinal direction thereof.

10. A bar code reading device for a photographic film according to claim 6, wherein said pair of bar code reading means detect different portions of a bar code.

11. A device for reading bar codes, according to claim 6, wherein said symbol represents bar codes and alphanumeric characters, and wherein said determination means determines that said symbol represents a bar code and not an alphanumeric character when said results are identical.

* * * * *